Oct. 8, 1968   B. M. SÖDERGÅRD ET AL   3,404,582

THREADED CONTROL MEANS

Filed June 2, 1965

INVENTORS
BENGT MARTIN SÖDERGÅRD
STEN HENRIK DANIELI

BY
Bailey, Stephens & Huettig
ATTORNEYS

United States Patent Office 3,404,582
Patented Oct. 8, 1968

3,404,582
THREADED CONTROL MEANS
Bengt Martin Södergård and Sten Henrik Danieli, Vasteras, Sweden, assignors to Allmänna Svenska Elektriska Aktiebolaget, Vasteras, Sweden, a corporation of Sweden
Filed June 2, 1965, Ser. No. 460,782
Claims priority, application Sweden, June 12, 1964, 7,166/64
14 Claims. (Cl. 74—424.8)

ABSTRACT OF THE DISCLOSURE

In a screw and nut control gearing designed for high temperature and corrosive atmosphere duty and having a stainless steel main screw member, a self-lubricating nut including a threaded graphite guide bushing engageable with the main screw member. The threaded graphite guide bushing is pre-stresed by stainless steel pre-stress means to such an extent that the difference in linear thermal expansivity as well as in elasticity between the threaded graphite bushing and the stainless steel main screw member is substantially compensated.

---

Figure 1:
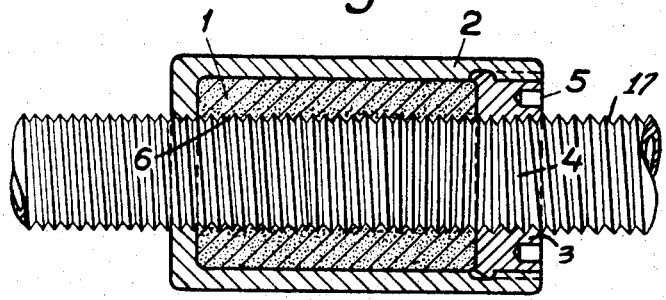

The present invention refers to a screw and nut control means, comprising a threaded guide bushing and a screw member which has greater linear thermal expansivity than the guide bushing.

A threaded control means which has to operate at high working temperature and/or in corrosive atmosphere cannot usually be manufactured of steel since it has been proved very difficult at high working temperatures to arrange such a lubrication of the screw or nut that the control means is able to take up the load without jamming. It is known to make the screw of steel and the nut of graphite, which so far is an acceptable solution since the graphite runs over steel relatively easily even under unfavourable operating conditions. On the other hand the use of a graphite nut involves several disadvantages because of the fact that graphite and steel have completely different material characteristics. Of special importance is the great difference in linear thermal expansivity between graphite and steel and also the difference in elasticity. The difference in material characteristics means that threads in a graphite nut co-operating with a steel screw becomes very unevenly loaded, with static loads as well as upon temperature changes.

The object of the present invention is to effect a threaded control means which can operate under very demanding working conditions, for example at high temperatures and in a corrosive atmosphere and in which the disadvantages which normally occur when the screw part and the nut part consist of different materials are to a great extent eliminated. The invention is characterised in that a pre-stress means is arranged to give the guide bushing a compressing axial pre-stress, said pre-stress means being of a material with greater linear thermal expansivity than the guide bushing. Thus, in the most simple embodiment of the invention the guide bushing, which has low thermal expansivity, is pressed together in axial direction by a pre-stress means with greater thermal expansivity. With increased temperature the axial pre-stress in the guide bushing is decreased because the pre-stress means expands due to normal thermal expansion. The thermal expansivity of the guide bushing is presumed to be less than that of the screw member, but the elastic counterforce which is produced in the guide bushing when the pre-stres is decreased causes the total linear expansion of the guide bushing reach a higher value than its normal thermal expansion, so that relatively good conformity between the linear expansion of the screw member and the guide bushing can thereby be achieved. If the pre-stress means has the same linear thermal expansivity as the screw member, complete conformity between the linear expansion of the guide bushing and the screw member is not nevertheless achieved, because of the fact that the reduced axial extension strain in the pre-stress means causes an elastic counterforce directed against the thermal expansion which means that the composite nut member is not completely capable of following the linear expansion of the screw member.

In order to solve the above mentioned problem, it is feasible to make that pre-stress means of the guide bushing of a material with greater thermal expansivity than the screw member. Purely theoretically the same linear expansion of the nut and the screw could thereby be reached, but in practice it is often difficult to find materials which are suitable for the purpose and whose thermal expansivities are in the desired relation to each other. According to the invention, this problem can also be solved in another way which in practice has proved to be more useful, in spite of the fact that it entails a somewhat more complicated form of the nut member. This embodiment of the invention is characterised in that the guide bushing is surrounded by an outer bushing, which is axially compressed by the prestressing means, said means having greater linear thermal expansivity than the outer bushing. By adapting the cross sections of the parts included in a nut formed in this way in relation to their thermal expansivities, the linear expansion of the nut can with great accuracy be made to follow the linear expansion of the screw member.

Figure 2:
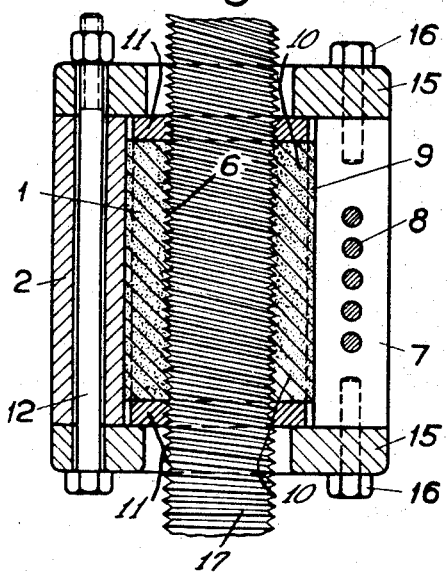
Figure 3:
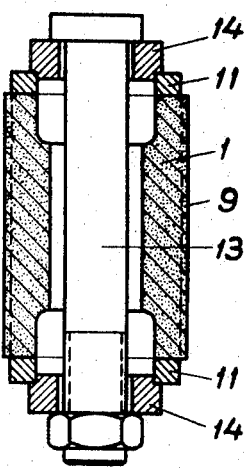

The invention will in the following be more fully described with reference to the accompanying drawings which show schematically different embodiments of the invention. FIG. 1 shows in axial section the most simple embodiment of a screw and nut control means according to the invention. FIG. 2 shows also in axial section another embodiment and FIG. 3 shows a phase of the manufacture of a nut member of the kind shown in FIG. 2.

The guide bushing in the nut member is denoted by 1, and is preferably made of graphite. The guide bushing is surrounded by an outer bushing 2 which can be made of steel, in the embodiment according to FIG. 2, preferably of the same steel as the screw member 17 and in the embodiment according to FIG. 1, preferably of a material with somewhat greater thermal expansivity than the screw member. Axial pre-stress of the guide bushing 1 is effected according to FIG. 1 by means of a tightening ring 3 which is threaded in the outer bushing 2 and which can have a polygonal centre opening 4 or be provided with bores 5 or other suitable recesses, which provide a grip for a key with which the tightening ring can be turned round. The nut device for use in a control means according to FIG. 1 is made by the tightening ring 3 being tightened when the composite nut is heated to the intended working temperature or to a higher temperature. After the nut has again re-cooled to a normal temperature, the main thread 6 in the guide bushing 1 is cut.

Because of the reasons mentioned previously it is difficult to achieve the same linear expansion for a nut member as for the screw member. For this purpose it is required that the outer bushing 2 has a thermal expansivity which is approximately 3 percent greater than the thermal expansivity of the screw member and in practice it is usually extremely difficult to find a suitable material with just this difference in linear expansivity. According to the invention, however, the nut member can be developed further so that when engaging the screw member the embodiment shown in FIG. 2 is produced, which in practice is more suitable for proper adaptation to the material characteristics of the screw member. In the screw and nut control means according to FIG. 2 the guide bushing also consists of graphite and as in FIG. 1 the guide bushing is designated by 1 and the outer bushing by 2. The outer bushing 2 can be divided axially or provided with a longitudinal slot 7, across which tangential screw members 8 are arranged with which the outer bushing 2 can be tightened round the guide bushing 1. The guide bushing 1 is provided with a relatively fine external thread which forms a thread joint 9 with a corresponding internal thread in any outer bushing 2. With the screw members 8 the play in the thread joint 9 can be excluded. The thread joint 9 gives the advantage that the transmission of force between the outer bushing 2 and the guide bushing 1 becomes substantially evenly divided along the whole length of the bushing 1. By this means the relatively great elastic springing which occurs in the graphite does not influence to any appreciable extent the guidance in the main thread 6, but the graphite bushing 1 will completely follow the movement of the outer bushing 2.

In order to avoid stress concentrations in the guide bushing 1 due to forces in the material, the guide bushing is made with a collar 10 projecting at each end, which in the axial direction projects from the main thread 6 and against which the axial pre-stressing force is transmitted over support rings 11.

The embodiment according to FIG. 2 comprises pre-stress means in the form of through draw bolts 12, which are arranged to give the outer bushing 2 and the guide bushing 1 a certain axial pre-stress. The draw bolts 12 are made of another material than the outer bushing 2 and the main screw member 17. Preferably the main screw member 17 and the outer bushing 2 are made of the same material as also the other parts of the nut member with the exception of the graphite bushing 1 and the draw bolts 12. The draw bolts 12 are made of a material which has greater linear thermal expansivity than the other materials mentioned. In order that the linear expansion of the nut member shall completely follow the linear expansion of the screw member, the parts of the nut member should be dimensioned according to the formula:

$$kA_2E_2(a_2-a_4) = E_1A_1(a_4-a_1) + E_3A_3(a_4-a_3)$$

where $A_1$ = the cross sectional area of the outer bushing
$A_2$ = the cross sectional area of the pre-stress means
$A_3$ = the cross sectional area of the guide bushing
$E_1$ = the coefficient of elasticity of the outer bushing
$E_2$ = the coefficient of elasticity of the pre-stress means
$E_3$ = the coefficient of elasticity of the guide bushing
$a_1$ = the linear thermal expansivity of the outer bushing
$a_2$ = the linear thermal expansivity of the pre-stress means
$a_3$ = the linear thermal expansivity of the guide bushing
$a_4$ = the linear thermal expansivity of the screw member If the cross sectional areas are chosen so that the factor $k$ has the value 1, complete conformity between the linear expansion of the nut member and the screw member is achieved. In practice it is of course not necessary to have 100 percent conformity and the factor $k$ can therefore, depending on the desired accuracy, have a value which lies between 0.9 and 1.1, preferably between 0.95 and 1.05. If the screw member 17 and the outer bushing 2 is made of material with the same thermal expansivity, i.e. preferably of the same material, the formula is simplified because $a_1=a_4$. The middle term thus disappears completely.

In a control means according to the invention which is to operate at high temperatures and in a corrosive atmosphere, graphite is particularly suitable as a material for the guide bushing 1. The remaining parts can with advantage consist of steel, preferably stainless steel.

FIG. 3 illustrates a phase in a method of manufacturing a nut member of the kind shown in FIG. 2. The manufacture can take place in the following way:

The graphite bushing 1, which is unthreaded, is provided with end rings 11 and pre-stressed axially by means of a central through bolt 13 which transmits the stress force to the end rings 11 over special auxiliary rings 14. In pre-stressed condition, the graphite bushing 1 is externally threaded with a relatively fine thread 9 and is screwed into the outer bushing 2 (FIG. 2). After this the screw members 8 are tightened so that the play in the thread joint 9 is excluded, which is suitably carried out in a warm condition, i.e. at approximately the working temperature of the control means. In a cold condition, the common end surfaces of the outer bushing 2 and the end rings 11 are then faced by grinding. After this ring-shaped end pieces 15 are fitted which are connected to the outer bushing 2 by means of a number of screws 16, which contribute to transmit the pre-stress forces from the end rings 11 to the outer bushing 2. Finally the draw bolts 12 are set in and are tightened and not until then can the auxiliary bolt 13 be removed. The main thread of the guide bushing 1 is not cut until the nut member has been assembled in the above described way. The thread cutting is carried out in a cold condition.

The manufacture of a nut member for use in a screw and nut control means according to FIG. 1 is carried out in a corresponding way. The tightening ring 3 is tightened when the nut member is heated to approximately the working temperature or higher and the main thread 6 of the guide bushing is cut in the ready-stressed guide bushing 1 when the nut member has again become cold.

We claim:

1. A screw and nut control means comprising a main screw member, an outer guide bushing, an inner threaded guide bushing threadedly engaging with main screw member, said screw member having greater linear thermal expansivity than said guide bushing, pre-stress means carried by said nut axially compressing said guide bushing, said pre-stress means being of a material with greater linear thermal expansivity than said guide bushing.

2. Control means according to claim 1, said pre-stress means having greater linear thermal expansivity than said main screw member.

3. Control means according to claim 1, said guide bushing consisting of graphite.

4. Control means according to claim 1, said pre-stress means loading said outer bushing axially and having greater linear thermal expansivity than said outer bushing.

5. Control means according to claim 4, said guide bushing being threaded in said outer bushing.

6. Control means according to claim 4, in which said outer bushing is provided with at least one longitudinal slot and with circumferential tightening means for said outer bushing.

7. Control means according to claim 4, said guide bushing being internally threaded, said pre-stress means engaging at least substantially ring-shaped end surfaces of said guide bushing, said surfaces being located axially outside said internal thread of the guide bushing.

8. Control means according to claim 4, dimensioned so that in the formula $$kA_2E_2(a_2-a_4) = E_1A_1(a_4-a_1) + E_3A_3(a_4-a_3)$$

where $A_1$ = the cross sectional area of the outer bushing
$A_2$ = the cross sectional area of the pre-stress means
$A_3$ = the cross sectional area of the guide bushing
$E_1$ = the coefficient of elasticity of the outer bushing
$E_2$ = the coefficient of elasticity of the pre-stress device
$E_3$ = the coefficient of elasticity of the guide bushing
$a_1$ = the linear thermal expansivity of the outer bushing
$a_2$ = the linear thermal expansivity of the pre-stress means
$a_3$ = the linear thermal expansivity of the guide bushing $a_4$ = the linear thermal expansivity of the main screw member the factor $k$ has a value which lies between 0.9 and 1.1.

9. Control means according to claim 8, said factor $k$ having a value between 0.95 and 1.05.

10. Control means according to claim 4, said outer bushing and said main screw member consisting of materials having the same linear thermal expansivity.

11. Control means according to claim 10, said outer bushing and said main screw member consisting of the same material.

12. Method of manufacturing the nut member of a screw and nut control means having a main screw member, a nut including an outer bushing and an inner threaded guide bushing engageable with said main screw member, said screw member having greater linear thermal expansivity than said guide bushing, pre-stress means carried by said outer bushing axially compressing said guide bushing, said outer bushing being of a material with greater linear thermal expansivity than said guide bushing, said method comprising the steps of tightening said pre-stress means at a temperature at least substantially as high as the operating temperature at which said control means is intended to work, cooling said guide bushing at least substantially to room temperature and thereafter forming a thread of the shape of the thread of said main screw member internally in said guide bushing.

13. Method of manufacturing the nut member of a screw and nut control means having a main screw member, a nut including a threaded guide bushing engageable with said main screw member, said screw member having greater linear thermal expansivity than said guide bushing, said nut further comprising an outer bushing threaded on said guide bushing, pre-stress means carried by said nut axially compressing said guide bushing and said outer bushing, said pre-stress means being of a material having greater linear thermal expansivity than said guide bushing and said outer bushing, said method comprising the steps of applying a through-going central clamp bolt to axially pre-stress said guide bushing, thereafter cutting on said guide bushing an external thread corresponding to a similar internal thread in said outer bushing, screwing said guide bushing into said outer bushing, applying a second pre-stress means to load said outer bushing axially, loosening and removing said clamp bolt and forming said guide bushing an internal thread having the shape of the thread of said main screw member.

14. A screw and nut control means comprising a main screw member, a nut including an outer bushing and an inner threaded guide bushing, threadedly engaging with said main screw member, pre-stress means carried by said outer bushing engaging the ends of said guide bushing for axially compressing said guide bushing, said outer bushing being of a material with greater liner thermal expansivity than said guide bushing.

References Cited

UNITED STATES PATENTS

| | | | |
|---|---|---|---|
| 2,897,025 | 7/1959 | Nickerson | 308—237 |
| 108,081 | 10/1870 | Murfey | 308—237 |
| 1,685,005 | 9/1928 | Robertson | 308—237 |
| 1,884,050 | 10/1932 | McCormick | 308—237 |
| 2,177,040 | 10/1939 | Huhn | 308—237 |
| 2,602,708 | 7/1952 | Wheildun | 308—327 |
| 2,602,709 | 7/1952 | Wheildun | 308—237 |
| 2,874,007 | 2/1959 | Cametti et al. | 308—237 |
| 2,897,025 | 7/1959 | Nickerson | 308—237 |

FOREIGN PATENTS

| | | |
|---|---|---|
| 515,257 | 11/1939 | Great Britain. |
| 604,030 | 9/1925 | France. |
| 1,354,182 | 1/1963 | France. |

MARION PARSONS, JR., *Primary Examiner.*